Nov. 18, 1969   J. G. BAKER   3,478,662
MULTIPLE-AXIS FOLDED OPTICAL SYSTEM
FOR A PHOTOGRAPHIC CAMERA
Filed Dec. 15, 1966
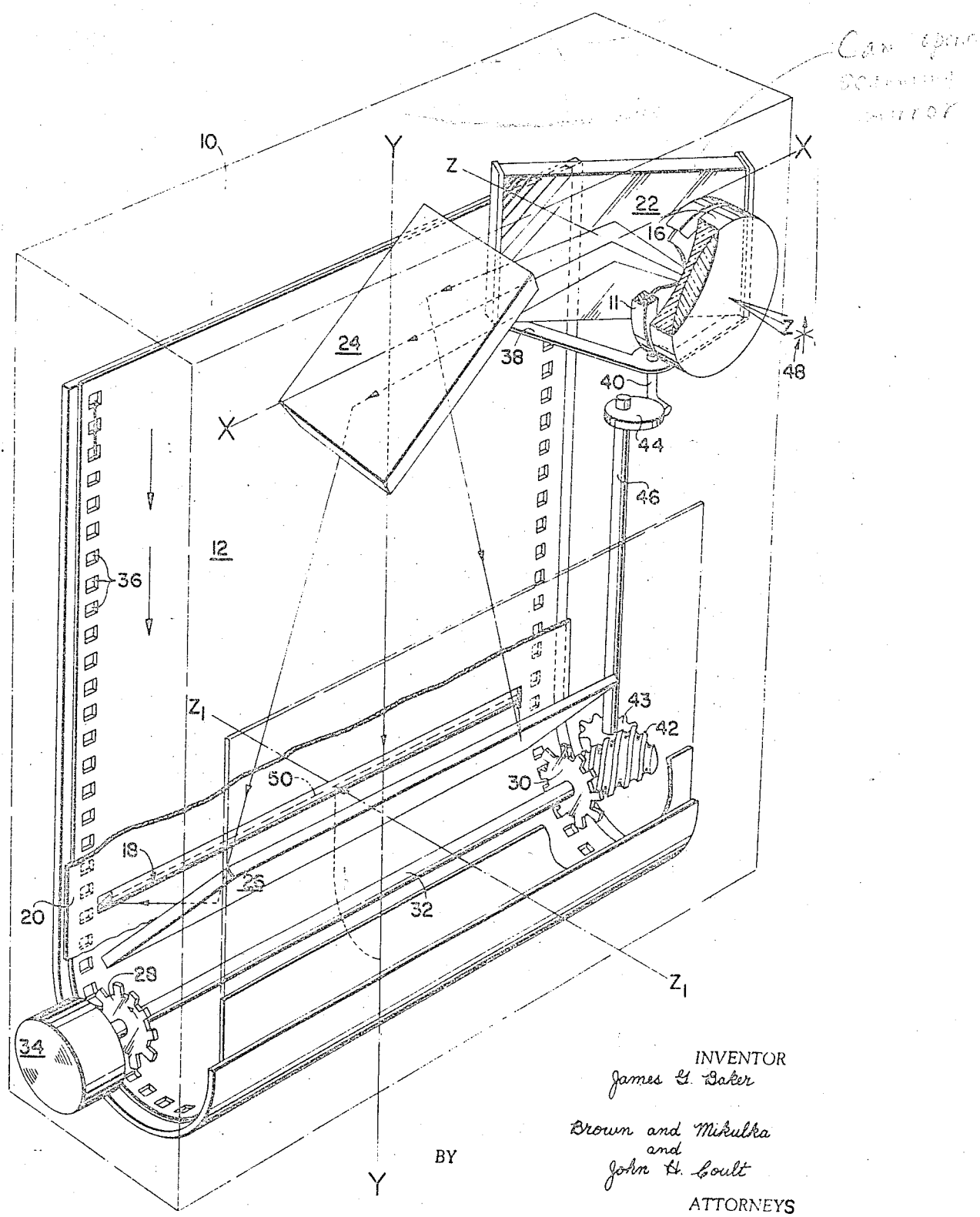
INVENTOR
James G. Baker
BY Brown and Mikulka
and
John H. Coult
ATTORNEYS 3,478,662
MULTIPLE-AXIS FOLDED OPTICAL SYSTEM FOR A PHOTOGRAPHIC CAMERA
James G. Baker, Winchester, Mass., assignor to Polaroid Corporation, Cambridge, Mass., a corporation of Delaware
Filed Dec. 15, 1966, Ser. No. 601,946
Int. Cl. G03b 37/02
U.S. Cl. 95—15
8 Claims

ABSTRACT OF THE DISCLOSURE

A compact, non-folding photographic camera embodying a folded optical system. The camera includes a relatively long focal length objective lens structure for imaging a scene upon a photosensitive material within the camera. The folded optical system for folding the exposure light path from the scene to the photosensitive material comprises a plurality of light reflective surfaces arranged to deflect the exposure light path successively along three substantially mutually orthogonal axes to permit not only the depth dimension but also either the width or length dimension of the camera to be especially compact.

CROSS REFERENCES TO RELATED APPLICATIONS

A compact camera is disclosed in a copending application of Edwin H. Land, Ser. No. 549,961, filed May 31, 1966 (now U.S. Patent No. 3,405,619, issued Oct. 15, 1968), which has a front-to-back depth dimension which is small in comparison with the focal length of the objective lens means which may be used and in relation to the usable film format size. In order to obtain such a compact camera, the exposure light path is folded along two mutually orthogonal axes parallel to the length and depth dimensions of the camera. The photosensitive material is exposed incrementally but continuously while being transported behind an elongated focal plane aperture. Means are provided for causing the image formed by the objective lens means to move with the photosensitive material during exposure so as to remain substantially stationary with respect thereto.

OBJECTS

It is an object of this invention to provide an improved compact camera in the general nature of the camera described above having an optical system by which the exposure light path may be compactly folded so as to accommodate an objective lens means having a long focal length in a very compact volume.

It is another object to provide a compact camera including in its optical system a plurality of light reflective surfaces arranged to deflect the exposure light path successively along at least two substantially mutually orthogonal axes to permit not only the depth dimension but also either the width or length dimension of the camera to be especially compact.

SUMMARY OF THE INVENTION

A compact photographic camera including a relatively long focal length objective lens structure for imaging a scene upon a photosensitive material within the camera, and optical means for folding the exposure light path from the scene to the photosensiitve material.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein the figure is a perspective view of a photographic camera which might be constructed in accordance with the principles of the invention. The camera housing is shown in phantom lines in order to clearly illustrate the internal structures. Certain components of the camera which are not necessary to the understanding of the present invention have been omitted in the interest of clarity and simplicity.

In cameras constructed in accordance with this invention, a relatively large film format and a correspondingly long focal length objective lens can be accommodated in a compact non-folding camera having a housing which is especially compact in the front-to-back dimension, referred to hereinafter as the depth dimension.

DESCRIPTION OF THE PREFERRED EMBODIMENTS

The drawing depicts a photographic camera incorporating embodiment of the invention, the camera including a housing 10 defining a generally rectangular volume having a minor depth dimension substantially smaller than major length and width dimensions thereof. The camera may include a variable diaphragm 11 and objective lens means for forming an image of the scene on a sheet 12 of photosensitive material. Although numerous suitable objective lens structures may be devised, for clarity of illustration of the invention a simple two-element achromatic lens 16 is shown to represent the image-forming means for the camera.

In order to accommodate a long focal length image-forming lens in such a compact camera, optical means are provided in accordance with the present invention for folding the optical path from the scene to the photosensitive material. As taught in the above-identified copending application of E. H. Land, a long focal length lens and a large film format may be accommodated in a compact camera by causing the photographic image to be formed through an elongated focal plane aperture 18 in a mask 20 in an image plane immediately behind and parallel to the mask 20. Means are provided for simultaneously scanning the scene in coordination with a transport of the film in the image plane behind the aperture 18. With a proper coordination of the scan of the scene and the transport of the film, the image of the scene formed on the photosensitive sheet may be rendered stationary relative to the moving sheet 12.

An optical system constructed in accordance with this invention may, as in the preferred embodiment illustrated, comprise a plurality of light reflective surfaces arranged to successively deflect the exposure light path from the scene sequentially along three substantially mutually orthogonal axes and through the focal plane aperture 18 to the photosensitive sheet 12. The optical structure for thus operating on exposure light path may include a planar mirror 22 disposed in the path of light incident from the scene along an axis parallel to the depth dimension of the housing 10, hereinafter termed the Z—Z axis. The mirror 22 is oriented at approximately 45° to the Z—Z axis so as to deflect the light path along a second axis, the X—X axis, substantially orthogonal to the Z—Z axis and parallel to the width dimension of the housing 10.

A second planar mirror 24 is disposed in the exposure light path on the X—X axis at an angle of approximately 45° with respect thereto so as to deflect the light path along an axis, the Y—Y axis, parallel to the length dimension of housing 10 and substantially orthogonal to the X—X and Z—Z axes. The mirror 24, in addition to producing a reversal of the image formed by the lens 16, effects the 90° rotation of the image necessary in order that a horizontal scan of the scene may be harmonized with a transport of the photosensitive sheet 12 in a direction orthogonal to the direction of the scan of the scene.

A third planar mirror 26 is disposed adjacent the focal plane aperture 18 and on the Y—Y axis. The mirror 26 is oriented at approximately 45° with respect to the Y—Y axis to deflect the light path along an axis, $Z_1$—$Z_1$, parallel to the Z—Z axis and through the aperture 18.

It is evident from the drawing and the above description that the mask 20 and the limited effective horizontal field angle of the described optical system permit at any instant only a narrow segment of the scene being photographed to be formed upon the photosensitive sheet 12. So that a complete image of the scene may be formed on the photosensitive sheet 12 during an exposure interval, means are provided for simultaneously, and in coordination, transporting the photosensitive sheet 12 while causing the optical system to scan the scene being photographed.

As indicated in the above-identified patent application of E. H. Land, the transportation of the photosensitive sheet 12 relative to the exposure aperture 18 during exposure acts as a shutter by determining the interval during which each increment of the photosensitive sheet 12 is exposed to actinic light from the scene. The duration of exposure of any incremental area of the photosensitive sheet 12 is a function of the aperture width and the speed of movement of the sheet 12 past the aperture 18. The total time required to make a complete exposure of the sheet 12 depends upon the length of the portion of the sheet which is to be exposed and the speed at which the sheet 12 is transported during exposure. For example, an area of a sheet three inches in length may be subjected to an exposure of $1/60$ second by moving the sheet past an aperture .15 inch wide at a rate of nine inches per second with a total time required for exposure of $1/3$ second.

It is noted that the width of the aperture 18 in no way affects the intensity of the exposure light admitted to the photosensitive sheet 12, but rather is one factor in determining the effective exposure interval. The diaphragm 11 serves the conventional $f$-number and depth-of-field determining functions of a stop.

Numerous methods and means may be employed for effecting such a simultaneous scan of the scene and transport of the film materials, the drawing showing one illustrative example representative of the many structures which may be employed for performing this act.

Structure for effecting a constant speed transport of the photosensitive sheet 12 behind the aperture 18 in mask 20 may comprise a pair of sprockets 28, 30 on a shaft 32 driven by a motor 34 which may, for example, be either battery- or spring-powered. The sprockets 28 engage suitable perforations 36 in the photosensitive sheet 12 for moving the sheet 12 at a rate dependent upon the speed of the motor 34.

In order that a scan of the scene may be achieved in coordination with a transport of the photosensitive sheet 12, means may be provided for rotating the mirror 22 during exposure. Such means for rotating mirror 22 may comprise a yoke 38 supporting the mirror 22 for rotation upon a shaft 40. A set of worm gears 42, 43 driven off shaft 32 may be utilized to rotate a radial cam 44 on a cam-carrying shaft 46. A transverse arm on shaft 40 is adapted to engage a suitably shaped cam 44 in order that rotation of the drive shaft 32 to drive the sheet 12 may be coordinated with rotation of the mirror 22 on shaft 40.

By a proper design of the configuration of cam 44, the gear ratio of the worm gears 42, 43, the location of the pivot axis of the shaft 40 with respect to the location and angular orientation of the mirror 22, and the various other pertinent parameters involved, the scan of the scene being photographed and the transport of the photosensitive sheet 12 may be precisely coordinated such that the successive imaging of adjacent increments of the scene on the moving photosensitive sheet 12 during exposure results in a complete and accurate image of the scene being formed on the sheet 12. The figure represents the camera as it might appear if stopped at an instant during exposure.

It is evident that by this invention optical means have been provided with which a long focal length objective lens means and a correspondingly large film format may be accommodated in an extremely compact, non-folding camera.

Certain changes may be made in the above apparatus without departing from the scope of the invention herein involved. For example, any or all of the illustrated light reflective surfaces may be provided by total reflection prisms rather than mirrors such as are illustrated at 22, 24 and 26.

An Amici or roof prism may be located on the Z—Z axis in substitution for mirror 22 or on the X—X axis in substitution for mirror 24. It is noted that the substitution of a 45° inclined roof or Amici prism at either of these locations would have the effect of producing an additional reversal of the image while preserving the orthogonal relationship of the axes of the incident and reflected light.

It is noted that the light reflective means incorporated in the exposure optics of the illustrated embodiment of the invention effect an odd number of reversals of the image formed on the photosensitive sheet 12. It is evident that, for development by conventional processes, the negative image would have to be further reversed an odd number of times to produce an accurate erect image of the photographic subject. An embodiment constructed without a third reflective surface, such as mirror 26, to deflect the exposure light parallel to the Z—Z axis, or one employing a roof prism in place of either of mirrors 22 and 24, as suggested above, would require no such subsequent reversal of the negative image.

Whereas an optical system has been shown in which the exposure light path is introduced into the camera near the upper left-hand corner thereof, the invention contemplates a system constructed such that the light path enters the camera housing adjacent the upper right-hand corner thereof. The attitude of mirrors 22 and 24 would, of course, have to be altered accordingly. As a further alternative, the mirror 26 might be rotated 90° about its lengthwise axis to deflect the optical path into impingement with photosensitive material behind an exposure aperture parallel to the illustrated aperture 18 but located near the front, rather than the rear, wall of the housing 10.

As suggested above, in another embodiment of the invention the mirror 26 may be eliminated and the exposure effected through a focal plane exposure aperture disposed near the lower end of the housing in a plane parallel to the width and depth dimensions of the camera. It is evident, of course, that such an arrangement would require means different than illustrated for transporting the sheet 12 past the exposure aperture. It should be understood that other arrangements of light reflective surfaces may be devised within the teachings and purview of this invention.

As a still further example, of structures encompassed by this invention, whereas a simple two-element achromat has been shown positioned forwardly of the mirror 22, it should be understood that other more complex image-forming means may be used and that the image-forming means may be located in other parts of the optical path from the scene to the image plane. It is therefore intended that all matter contained in the above description or shown in the accompanying drawing shall be interpreted as illustrative and not in a limiting sense.

What is claimed is:

1. A compact photographic camera for exposing photosensitive material positioned initially in a predetermined plane within the camera, comprising, in combination:

means defining an elongated focal plane aperture adjacent the photosensitive material;

lens means for imaging a scene upon said photosensitive material through said focal plane aperture;

means for effecting relative movement during exposure between said photosensitive material and said aperture for sequentially exposing adjacent areas of said photosensitive material through said aperture;

means for effecting relative movement during exposure between the scene image formed by said lens means and said aperture so as to maintain said image stationary with respect to the photosensitive material; and optical means for folding the light path from the scene to the photosensitive material along three successive substantially mutually orthogonal axes, the second and third axes are parallel to the plane of the photosensitive material.

2. The apparatus defined by claim 1 wherein said optical means comprises a plurality of light reflective surfaces arranged to successively deflect the exposure light path along said three axes.

3. A compact photographic camera for exposing photosensitive material within the camera, comprising, in combination:

means defining elongated focal plane aperture adjacent the photosensitive material;

lens means for imaging a scene upon said photosensitive material through said focal plane aperture;

means for effecting relative movement during exposure between said photosensitive material and said aperture for sequentially exposing adjacent areas of said photosensitive material through said aperture;

means for effecting relative movement during exposure between the scene image formed by said lens means and said aperture so as to maintain said image stationary with respect to the photosensitive material;

a first planar light reflective surface oriented at approximately 45° with respect to light incident from the scene along a first axis so as to deflect the light path along a second axis substantially orthogonal to said first axis, and parallel to said photosensitive material;

a second planar light reflective surface disposed on said second axis and at an angle of approximately 45° thereto so as to deflect the light path along a third axis substantially orthorgonal to said first and second axes, and parallel to said photosensitive material, a third planar light reflective surface disposed on said third axis and at an angle of approximately 45° thereto so as to deflect said light path in a direction substantially parallel to said first axis and through said aperture in said aperture means.

4. A compact photographic camera for exposing a photosensitive material in the camera comprising, in combination:

a housing having orthogonal depth, width and length axes;

lens means for imaging a scene upon a photosensitive material in a plane defined by said length and width axes;

means for defining an elongated focal plane aperture adjacent the photosensitive material;

means for effecting relative movement during exposure between said photosensitive material and said aperture for sequentially exposing adjacent areas of said photosensitive material through said aperture;

light reflective means for folding the light path from the scene to the photosensitive material, comprising a plurality of light reflective surfaces arranged to successively deflect the light path along three successive substantially mutually orthogonal axes and through said aperture; and means including at least a part of said light reflective means for effecting a scan of the scene during exposure to produce a movement of the scene image relative to said aperture at a rate effective to maintain said scene image stationary with respect to the photosensitive material.

5. A compact photographic camera for exposing a photosensitive material in the camera comprising, in combination:

a housing having orthogonal depth, width and length axes;

lens means for imaging a scene upon a photosensitive material located initially in a plane defined by said length and width axes;

means for defining an elongated focal plane aperture adjacent the photosensitive material;

means for effecting relative movement during exposure between said photosensitive material and said aperture for sequentially exposing adjacent areas of said photosensitive material through said aperture;

a first planar mirror in the path of light from the scene being photographed, said first mirror being oriented at approximately 45° with respect to said depth axis so as to deflect the light path in a direction substantially along said width axis, a second planar mirror disposed in the light path at an angle of approximately 45° with respect to said width axis so as to deflect the light path in a direction substantially along said length axis, and a third planar mirror disposed in the light path at an angle of approximately 45° with respect to said length axis so as to deflect said light path in a direction substantially along said depth axis and through said aperture;

means including at least one of said planar mirrors for effecting a scan of the scene during exposure to produce a movement of the scene image relative to said aperture at a rate effective to maintain said scene image stationary with respect to the photosensitive material.

6. A compact photographic camera including a housing defining a generally rectangular volume having a minor depth dimension substantially smaller than major length and width dimensions thereof;

means defining an elongated focal plane exposure aperture eccentrically positioned within said housing;

means for supporting a sheet of photosensitive material whose width and length are greater than said depth dimension, within said housing and for transporting said sheet in a plane parallel to the plane defined by said length and width dimensions and past said exposure aperture at a predetermined velocity;

means located adjacent one corner of said rectangular volume for admitting light from a scene to be photographed to the interior of said housing along a first optical axis generally parallel to said depth dimension and perpendicular to the plane of said photosensitive material;

light reflective means for folding the optical path along two additional axes, mutually orthogonal to each other and parallel to said plane of said photosensitive material, from said means for admitting light into said housing to said exposure aperture;

lens means for focusing light from said scene as an image on the surface of said photosensitive material; and means for causing said lens means to scan said scene in synchronism with the movement of said photosensitive material past said exposure aperture to maintain said image stationary with respect to said photosensitive material.

7. A compact photographic camera including a housing defining a generally rectangular volume having a minor depth dimension substantially smaller than major length and width dimensions thereof;

means defining an elongated focal plane exposure aperture eccentrically positioned within said housing;
means for supporting a sheet of photosensitive material within said housing and for transporting said sheet past said exposure aperture at a predetermined velocity;
means located adjacent one corner of said rectangular volume for admitting light from a scene to be photographed to the interior of said housing along a first optical axis generally parallel to said depth dimension;
first reflector means angularly oriented with respect to said first optical axis to intercept light passing through said diaphragm means and reflect it along a second optical axis generally orthogonal to said first optical axis;
second reflector means angularly oriented with respect to said second optical axis and approximately parallel to said first axis to intercept light passing along said second optical axis and reflect it along a third optical axis generally orthogonal to both said first and second optical axes toward said exposure aperture;
lens means for focusing light passing along said optical axes from said scene as an image on the surface of said photosensitive material; and
means for causing said lens means to scan said scene in synchronism with the movement of said photosensitive material past said exposure aperture to maintain said image stationary with respect to said photosensitive material.

8. A compact photographic camera including a housing defining a generally rectangular volume having a minor depth dimension substantially smaller than major length and width dimensions thereof;
means defining an elongated focal plane exposure aperture eccentrically positioned within said housing and lying in a plane parallel to the major dimensions of said rectangular volume;
means for supporting a sheet of photosensitive material within said housing and for transporting said sheet past said exposure aperture at a predetermined velocity;
means located adjacent one corner of said rectangular volume for admitting light from a scene to be photographed to the interior of said housing along a first optical axis generally parallel to said depth dimension;
first reflector means angularly oriented with respect to said first optical axis to intercept light passing through said diaphragm means and reflect it along a second optical axis generally orthogonal to said first optical axis;
second reflector means angularly oriented with respect to said second optical axis to intercept light passing along said second optical axis and reflect it along a third optical axis generally orthogonal to said first and second optical axes toward said exposure aperture;
third reflector means angularly oriented with respect to said third optical axis to intercept light passing along said third optical axis and reflect it along a fourth optical axis generally parallel to said first optical axis toward said exposure aperture;
lens means for focusing light passing along said optical axes from said scene as an image on the surface of said photosensitive material; and
means for causing said lens means to scan said scene in synchronism with the movement of said photosensitive material past said exposure aperture to maintain said image stationary with respect to said photosensitive material.

References Cited

UNITED STATES PATENTS

| | | | |
|---|---|---|---|
| 1,947,668 | 2/1934 | Warmisham | 355—66 |
| 3,259,448 | 7/1966 | Whitley et al. | 352—174 |
| 3,366,024 | 1/1968 | Starp | 95—64 |
| 2,682,194 | 6/1954 | Rosenburgh | 88—24 |
| 2,966,696 | 12/1960 | D'Incerti et al. | 95—15 |

NORTON ANSHER, Primary Examiner

RICHARD M. SHEER, Assistant Examiner

U.S. Cl. X.R.

95—12.5; 355—66

UNITED STATES PATENT OFFICE
CERTIFICATE OF CORRECTION

Patent No. 3,478,662　　　　　　　Dated November 18, 1969

Inventor(s)　James G. Baker

It is certified that error appears in the above-identified patent and that said Letters Patent are hereby corrected as shown below:

Column 1, line 67, (appln., page 2, lines 11 and 12) "photosensiitve" should be --photosensitive--;

Column 2, line 26, (appln., page 3, line 12) after "rating" insert --a preferred--;

Column 2, line 61, (appln., page 4, line 19) after "on" insert --the--;

Column 5, line 49, (appln., claim 9, line 26) "orthorgonal" should be --orthogonal--.

Signed and sealed this 14th day of March 1972.

(SEAL)
Attest:

EDWARD M. FLETCHER, JR.　　　　　　ROBERT GOTTSCHALK
Attesting Officer　　　　　　　　　Commissioner of Patents